UNITED STATES PATENT OFFICE.

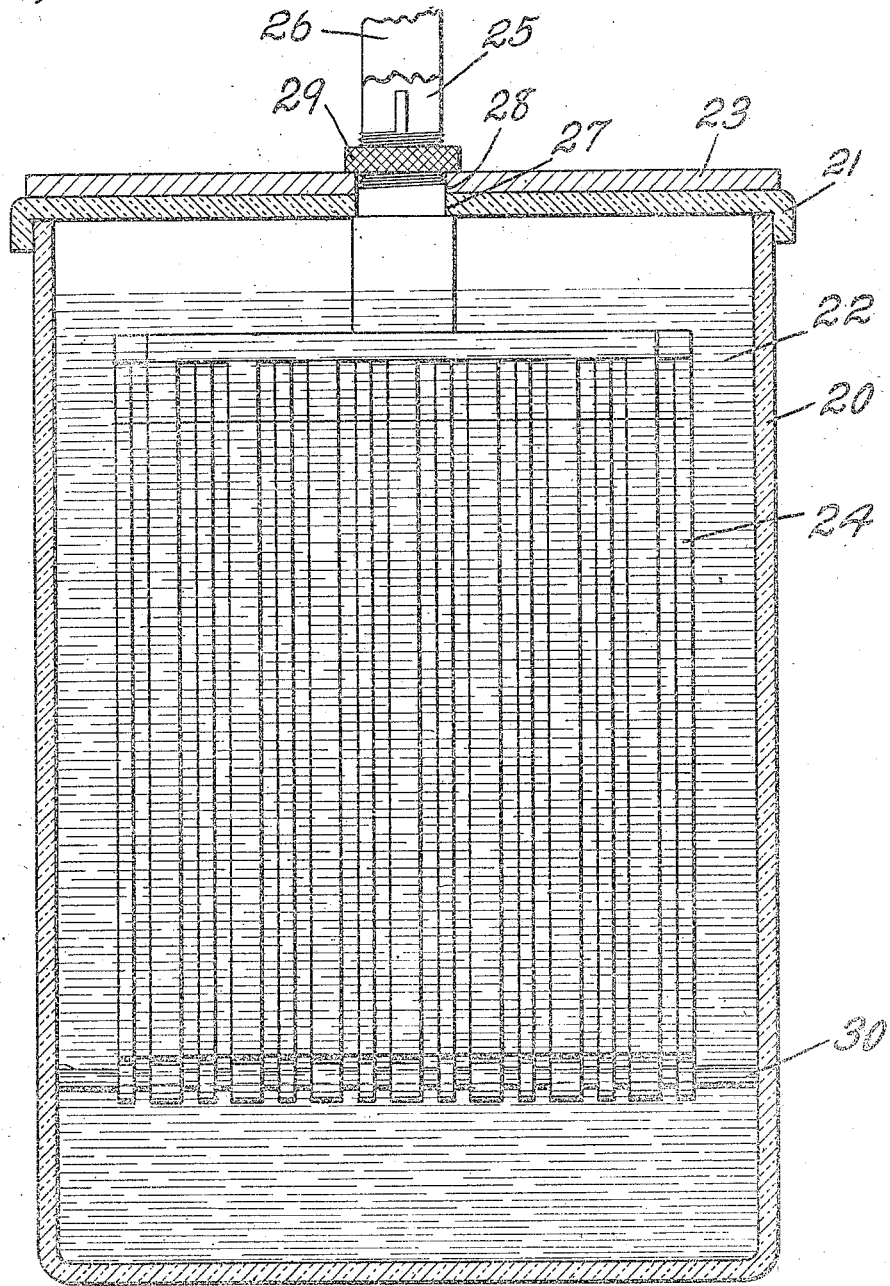

RALPH H. GRANT, OF DAYTON, OHIO, ASSIGNOR, BY MESNE ASSIGNMENTS, TO DELCO-LIGHT COMPANY, OF DAYTON, OHIO, A CORPORATION OF DELAWARE.

STORAGE BATTERY.

1,414,510.  Specification of Letters Patent.  Patented May 2, 1922.

Application filed September 9, 1918. Serial No. 253,134.

*To all whom it may concern:*

Be it known that I, RALPH H. GRANT, a citizen of the United States of America, residing at Dayton, county of Montgomery, State of Ohio, have invented certain new and useful Improvements in Storage Batteries, of which the following is a full, clear, and exact description.

This invention relates to improvements in storage batteries and particularly to that type of storage battery wherein the battery plates are suspended from the cover of the battery jar.

The general practice in the manufacture of batteries is to suspend the battery plates from the cover. These covers are made of non-conducting and acid proof materials. This material is generally fragile. The weight of the battery plates causes the covers to sag and break easily, especially when the battery jars are not handled carefully.

One of the objects of the present invention is to provide a support for the battery plates which will substantially relieve the strains on the cover.

Another object of the present invention is to reduce the quantity of non-conducting material, such as rubber, necessary for covers.

One manner of carrying out these objects is to provide a support of relatively high mechanical strength, mounted on the cover, which will take up the bending strains, and transmit the weight of plates to the battery jar walls through the cover, the cover being subject to compression strains only.

Other and further objects of the present invention will be apparent from the following description, wherein a preferred embodiment is described, reference being had to the following drawing.

In the drawing:

The figure is a sectional view of the battery jar, a cover and a support member mounted thereon, and a front elevation view of the battery plates mounted in the battery jar.

Referring to the drawing, the numeral 20 indicates the battery jar or container, 21 a cover of non-conducting material for the jar, and 22 the electrolyte therein. A support 23, preferably made of wood is mounted upon the cover 21. The positive and negative battery plates 24 are insulated from each other and attached to terminals 25 and 26, respectively. The terminal 26, which is shown behind the terminal 25, is mounted in the same manner as the terminal 25. Holes 27 are provided in the cover 21, which are in alinement with the holes 28 provided in the support 23. Terminals 25 and 26 are provided with screw threaded portions which project through the holes 27 and 28. The clamping nuts 29 engage terminals 25 and 26, and when said nuts are in their proper place they will clamp the cover 21 and support member 23 together and rigidly secure the plates in position. At the bottom of the battery plates a bolt 30 is provided and extends through the battery plates and is adapted to cooperate with the sides of the jar, thereby eliminating any unnecessary motions of the battery plates.

It will be apparent that the manner of supporting the battery plates herein described has advantages over the batteries of the usual construction. One of these advantages is that the bending strains due to the weight of the battery plates are taken up principally by the support member, thereby preventing the cover from sagging and breaking.

Due to the fact that the entire weight of the battery plates is on the support member and not on the fragile cover, except at the walls of the jar, the amount of material comprising the cover can be reduced beyond that which would be required, if the cover alone were made strong enough to support the plates.

Another advantage possessed by this invention is apparent when for any reason the fragile cover should be broken, the support will prevent the battery plates from dropping to the bottom of the container, and will prevent the breaking of the container.

While the form of the structure herein shown and described, constitute the preferred form of embodiment in the present invention, it is to be understood that other forms might be adopted, all coming within the scope of the claims which follow.

What I claim is as follows:—

1. In a battery, the combination with a container for electrolyte; of a cover for the container; a support removably mounted on said cover; and a set of battery plates mounted on the support.

2. In a battery, the combination with a container for electrolyte; of a cover for the container; a support removably mounted on said cover, said support projecting over the walls of the container; and a set of battery plates mounted on the support.

3. In a battery, the combination with a container for electrolyte; of a cover for the container provided with a hole; a set of battery plates having a terminal arranged to extend through said hole; a support for the battery plates removably mounted on said cover, said support being constructed and arranged to prevent the battery plates from dropping down to the bottom of the container if the cover should be broken, and including a hole through which the battery plate terminal projects; and means cooperating with said terminal to suspend the plates upon said support.

4. In a battery, the combination with a container for the electrolyte; of means for supporting the battery plates within the container; and means cooperating with the battery plates and the container to prevent lateral movement of the plates therein.

5. In a battery, the combination with a container; of a support mounted on said container for carrying the battery plates; and means adjacent the bottom of the battery plates and cooperating with the sides of the container to prevent lateral movement of the plates therein.

In testimony whereof I affix my signature.

RALPH H. GRANT.

Witnesses:
J. W. McDonald,
H. E. Sollenberger.